United States Patent
Ryon et al.

(10) Patent No.: US 10,557,630 B1
(45) Date of Patent: Feb. 11, 2020

(54) STACKABLE AIR SWIRLERS

(71) Applicant: Delavan Inc., West Des Moines, IA (US)

(72) Inventors: Jason A. Ryon, Carlisle, IA (US); Joseph Samo, Johnston, IA (US); Jacob Greenfield, Granger, IA (US); Andy W. Tibbs, Earlham, IA (US)

(73) Assignee: Delavan Inc., West Des Moines, IA (US)

( * ) Notice: Subject to any disclaimer, the term of this patent is extended or adjusted under 35 U.S.C. 154(b) by 0 days.

(21) Appl. No.: 16/248,137

(22) Filed: Jan. 15, 2019

(51) Int. Cl.
| | |
|---|---|
| *F23D 11/10* | (2006.01) |
| *F23R 3/28* | (2006.01) |
| *F23R 3/14* | (2006.01) |
| *B29C 64/176* | (2017.01) |
| *B33Y 99/00* | (2015.01) |
| *B29C 64/171* | (2017.01) |
| *B33Y 10/00* | (2015.01) |

(52) U.S. Cl.
CPC .......... *F23D 11/107* (2013.01); *B29C 64/176* (2017.08); *F23R 3/14* (2013.01); *F23R 3/28* (2013.01); *B29C 64/171* (2017.08); *B33Y 10/00* (2014.12); *B33Y 99/00* (2014.12); *Y10T 29/49794* (2015.01)

(58) Field of Classification Search
CPC ......... B33Y 10/00; B33Y 99/00; B29C 64/40; B29C 64/171; B29C 64/176; B29C 64/182; B29C 64/188; B29C 2793/00; B29C 2793/009; Y10Y 29/49799
See application file for complete search history.

(56) References Cited

U.S. PATENT DOCUMENTS

| | | | |
|---|---|---|---|
| 2,701,164 A | 2/1955 | Orent et al. | |
| 3,029,029 A | 4/1962 | Webster | |
| 3,638,865 A | 2/1972 | McEneny et al. | |
| 3,642,210 A | 2/1972 | Fluornoy et al. | |
| 3,790,086 A | 2/1974 | Masai | |
| 3,831,854 A | 8/1974 | Sato et al. | |
| 3,857,156 A * | 12/1974 | Clark | B29C 59/021 29/417 |
| 3,980,233 A | 9/1976 | Simmons et al. | |
| 4,024,748 A * | 5/1977 | Yashiro | B21D 53/16 72/337 |
| 4,432,122 A * | 2/1984 | Iijima | B23P 15/00 164/108 |
| 4,559,009 A | 12/1985 | Marino et al. | |
| 4,754,922 A | 7/1988 | Halvorsen et al. | |
| 4,831,700 A | 5/1989 | Halvorsen et al. | |
| 4,842,197 A | 6/1989 | Simon | |
| 5,094,610 A | 3/1992 | Mandai et al. | |
| 5,144,804 A | 9/1992 | Koblish et al. | |

(Continued)

OTHER PUBLICATIONS

European Search Report dated Feb. 5, 2014 issued during the prosecution of European Patent Application No. 05006417.9.

*Primary Examiner* — Jason L Vaughan
(74) *Attorney, Agent, or Firm* — Locke Lord LLP; Scott D. Wofsy; Joshua L. Jones

(57) ABSTRACT

A swirler includes an inner body defining a swirl axis. A plurality of swirl vanes extend outward from the inner body. The swirl vanes define respective swirl slots therebetween for imparting swirl on a fluid passing through the swirl slots. A method of making swirlers includes additively manufacturing a stack of swirlers.

10 Claims, 5 Drawing Sheets

(56) References Cited

U.S. PATENT DOCUMENTS

| | | | |
|---|---|---|---|
| 5,167,116 A | 12/1992 | Koblish et al. | |
| 5,228,624 A | 7/1993 | Mensink | |
| 5,299,909 A | 4/1994 | Wulf | |
| 5,427,314 A | 6/1995 | Hagar | |
| 5,499,768 A | 3/1996 | Tanaka et al. | |
| 5,505,045 A | 4/1996 | Lee et al. | |
| 5,605,287 A | 2/1997 | Mains | |
| 5,680,766 A | 10/1997 | Joshi et al. | |
| 5,761,907 A | 6/1998 | Pelletier et al. | |
| 5,797,268 A | 8/1998 | Ryan | |
| 5,823,764 A | 10/1998 | Alberti et al. | |
| 5,865,024 A | 2/1999 | Kress et al. | |
| 6,205,763 B1 | 3/2001 | Farmer et al. | |
| 6,224,816 B1 | 5/2001 | Hull et al. | |
| 6,256,883 B1 * | 7/2001 | Kinoshita | B41J 2/1606 205/158 |
| 6,256,995 B1 | 7/2001 | Sampath et al. | |
| 6,289,677 B1 | 9/2001 | Prociw et al. | |
| 6,363,726 B1 | 4/2002 | Durbin et al. | |
| 6,418,726 B1 | 7/2002 | Foust et al. | |
| 6,474,569 B1 | 11/2002 | Brundish et al. | |
| 6,484,489 B1 | 11/2002 | Foust et al. | |
| 6,539,724 B2 | 4/2003 | Cornwell et al. | |
| 6,547,163 B1 | 4/2003 | Mansour et al. | |
| 6,560,964 B2 | 5/2003 | Steinhorsson et al. | |
| 6,688,534 B2 | 2/2004 | Bretz | |
| 6,755,024 B1 | 6/2004 | Mao et al. | |
| 6,799,427 B2 | 10/2004 | Calvez et al. | |
| 6,865,889 B2 | 3/2005 | Mancini et al. | |
| 7,237,730 B2 | 7/2007 | Prociw et al. | |
| 7,823,289 B2 * | 11/2010 | Willers | B21C 23/142 29/412 |
| 7,832,102 B2 * | 11/2010 | Ide | B23K 20/122 228/2.1 |
| 8,348,180 B2 | 1/2013 | Mao et al. | |
| 9,399,320 B2 * | 7/2016 | Johnson | B33Y 10/00 |
| 10,066,082 B2 * | 9/2018 | Norikane | C08K 5/41 |
| 10,245,822 B2 * | 4/2019 | El-Siblani | B33Y 50/02 |
| 2003/0110776 A1 | 6/2003 | Teets | |
| 2004/0040310 A1 | 3/2004 | Prociw et al. | |
| 2004/0061001 A1 | 4/2004 | Mao et al. | |
| 2005/0241319 A1 | 11/2005 | Graves et al. | |
| 2006/0064874 A1 * | 3/2006 | Bonnville | B23P 11/005 29/897 |
| 2007/0164249 A1 * | 7/2007 | Willers | B21C 23/142 251/366 |
| 2007/0180698 A1 * | 8/2007 | Ide | B23K 20/122 29/897.2 |

* cited by examiner

STACKABLE AIR SWIRLERS

BACKGROUND

1. Technological Field

The present disclosure relates to nozzles and injectors, and more particularly to swirlers for nozzle and injectors such as used in fuel injection for gas turbine engines.

2. Description of Related Art

Air swirlers, such as for use as inner air swirlers in fuel injectors and nozzles, are traditionally difficult to make. Advanced engine designs have high requirements for performance including low emissions. This often translates into complex swirler designs. Using conventional machining the geometry, e.g., aerodynamic vane geometry, is intricate and therefore costly and time consuming. If turning slots are used, milling out the slots is time consuming and costly. Additive manufacturing can accommodate a variety of geometries, but is also slow and expensive due to the fact that traditional additive manufacturing machines do not have a large enough build plate to economically produce a large number of swirlers.

The conventional techniques have been considered satisfactory for their intended purpose. However, there is an ever present need for improved swirlers and processes of making swirlers. This disclosure may address at least one of these needs.

SUMMARY

A swirler includes an inner body defining a swirl axis. A plurality of swirl vanes extend outward from the inner body. The swirl vanes define respective swirl slots therebetween for imparting swirl on a fluid passing through the swirl slots.

The inner body can follow a first cone angle that diverges in a downstream direction along the swirl axis. The swirl vanes can define a frustoconical volume that follows a second cone angle that converges in the downstream direction. The swirl slots and swirl vanes can be oriented tangential to the swirl axis. An outer ring can be connected to the swirl vanes and can provide an outward boundary to the swirl slots. The inner body can have a constant wall thickness. The inner body can define a plurality of cooling holes therethrough inboard of the swirl slots.

A method of making swirlers includes additively manufacturing a vertical stack of swirlers as described above. Additively manufacturing the vertical stack can include building an external ring and an inner point inside the external ring and additively manufacturing the vertical stack in a vertical build direction from the external ring and inner point. The inner body of a lower most swirler in the vertical stack can originate from the inner point. The method can include additively manufacturing a central support rod aligned with the swirl axis of the swirlers. The central support rod can support between adjacent swirlers in the stack so that the inner bodies of swirlers in the stack can be built up, each starting from the central support rod and diverging therefrom in the vertical build direction. The central support rod can include frangible features adjacent each swirler connected thereto and further comprising breaking the frangible features to separate the swirlers in the stack from one another. Breaking the frangible features can include twisting the swirlers relative to one another. The method can include separating the swirlers from one another by machining away the central support rod. An external tube outboard of the swirl vanes can be built up from the external ring to support the build from outside. The method can include machining the external tube away to separate the swirlers from one another.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
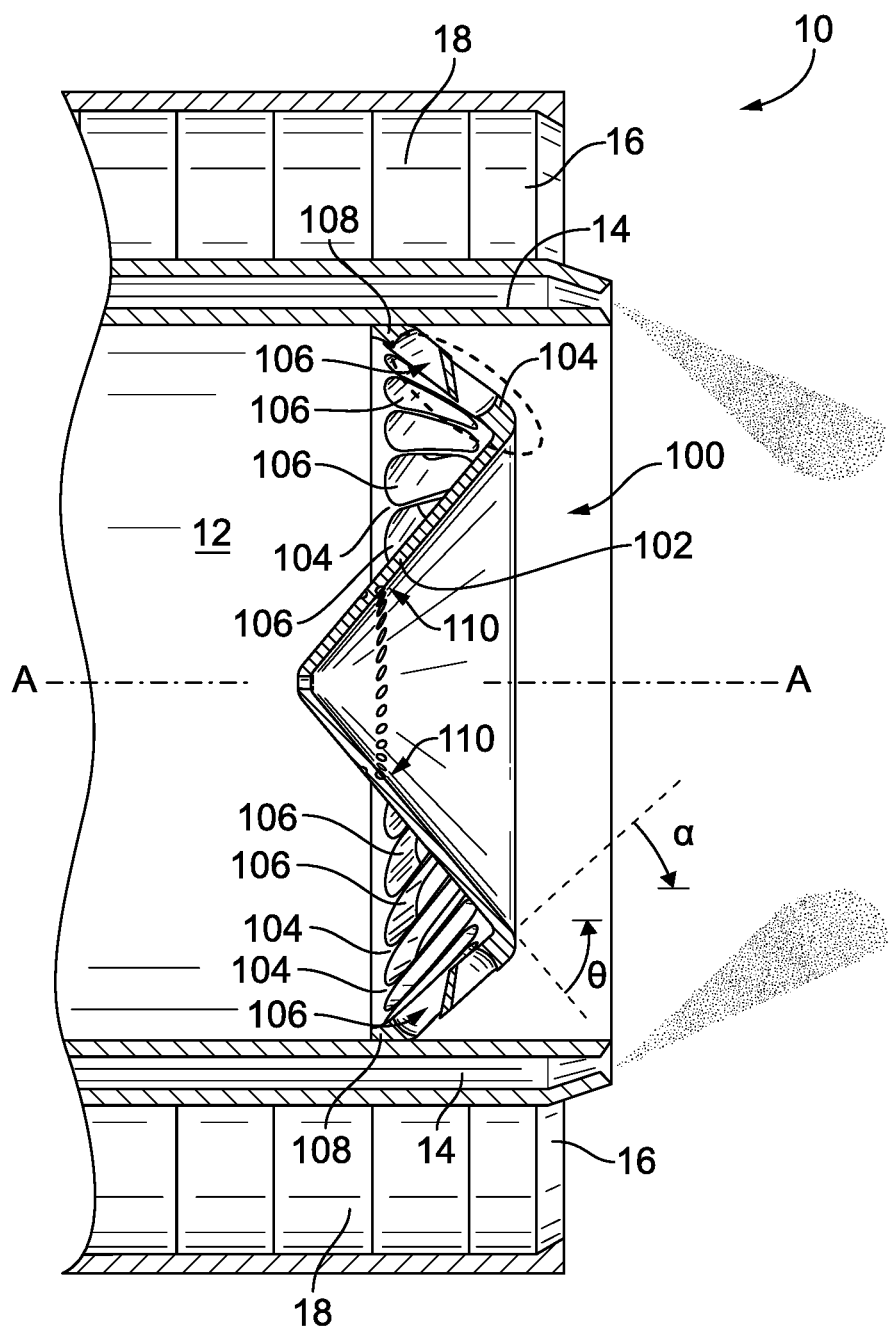
FIG. 1 is a cross-sectional side elevation view of an exemplary embodiment of a swirler constructed in accordance with the present disclosure, showing the swirler as an inner air swirler in a nozzle with an outer air cap and a fuel circuit between the inner swirler and outer air cap.

Reference will now be made to the drawings wherein like reference numerals identify similar structural features or aspects of the subject disclosure. For purposes of explanation and illustration, and not limitation, a partial view of an exemplary embodiment of a swirler in accordance with the disclosure is shown in FIG. 1 and is designated generally by reference character 100. Other embodiments of swirlers in accordance with the disclosure, or aspects thereof, are provided in FIGS. 2-5, as will be described. The systems and methods described herein can be used to facilitate manufacture of swirlers, such as for use as inner air swirlers in fuel injectors and nozzles.

The swirler 100 is seated as an inner air swirler in the inner air passage 12 of a nozzle 10 that defines a fuel passage 14 outboard of the inner air passage 12 and an outer air passage 16 with an outer air cap 18 outboard of the fuel passage 14. Fuel issued from the fuel passage 14 is sheared between swirling air from the outer air swirler 18 and from the inner air swirler 100 to atomize the fuel spray indicated in FIG. 1 by stippling for combustion, e.g., in a combustor of a gas turbine engine. Gaseous fuel can be used in addition to or in lieu of liquid fuel. The swirler 100 includes an inner body 102 defining a swirl axis A. A plurality of swirl vanes 104 extend outward from the inner body 102, i.e. away from the swirl axis A. The swirl vanes 104 define respective swirl slots 106 therebetween for imparting swirl on a fluid, e.g., air, passing through the swirl slots 106 from upstream of the swirler 100, i.e. the left side of the swirler 100 in FIG. 1, to downstream of the swirler 100, i.e. on the right side of the swirler 100 in FIG. 1.

The inner body 102 is a conical body that follows a first cone angle θ which diverges in a downstream direction along the swirl axis A, i.e. the conical body 102 gets further from the swirl axis A the further to the right it is along the swirl axis A in FIG. 1. The swirl vanes 104 define a frustoconical volume, e.g. indicated by the dotted area in FIG. 1, that follows a second cone angle α that converges in the downstream direction, i.e. the swirl vanes 104 get closer to the swirl axis A the further to the right they are in FIG. 1. Those skilled in the art will readily appreciate that while the inner body and swirl vanes follow conical geometries, it is not necessary for them to be strictly conical, e.g., they can follow any suitable curve. The swirl slots 106 and swirl vanes 104 are oriented tangential to the swirl axis A, in other words, the swirl slots 106 and swirl vanes 104 are not aligned along radii of axis A, but are offset from the radii of axis A as in a radial type swirler. An outer ring 108 is connected to the swirl vanes 104 and provides an outward boundary to the swirl slots 106. The inner body 102 has a constant wall thickness T, and a plurality of cooling holes 110 therethrough inboard of the swirl slots 106.

Figure 2:
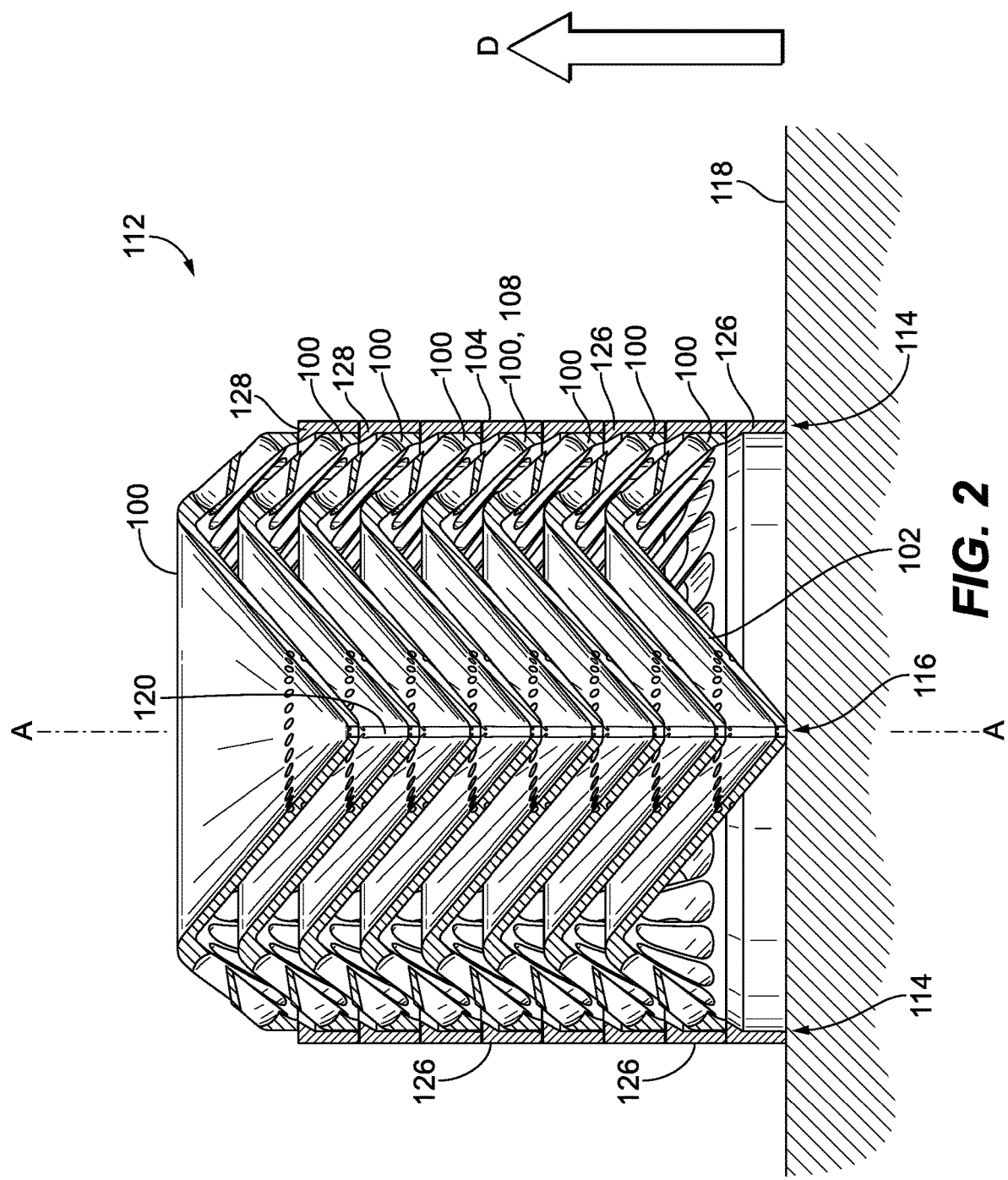
FIG. 2 is a cross-sectional side-elevation view of a stack of swirlers like the swirler of FIG. 1, showing the stack after additive manufacturing but before separation of the individual swirlers from the stack.

With reference now to FIG. 2, a method of making swirlers such as swirler 100 described above includes additively manufacturing a vertical, nested stack 112 of swirlers 100. Additively manufacturing the vertical stack includes building an external ring 114 and an inner point 116 inside the external ring 114 and additively manufacturing the vertical stack in a vertical build direction D from the external ring 114 and inner point 116. The external ring 114 and inner point 116 can be formed on a build plate 118, e.g. of a selective laser sintering machine. The inner body 102 of a lower most swirler in the vertical stack 112 originates from the inner point 116. The angle of the inner body 102 is conducive to being built up from this central point 116 in additive manufacturing machines. The method includes additively manufacturing a central support rod 120 aligned with the swirl axis A of the swirlers 100. The central support rod 120 supports between adjacent swirlers 100 in the stack 112 so that the inner bodies 102 of swirlers 100 in the stack 112 can each be built up from a central point, with all the swirlers but the lower most each starting from the central support rod 120 and diverging therefrom in the vertical build direction D.

Figure 4:
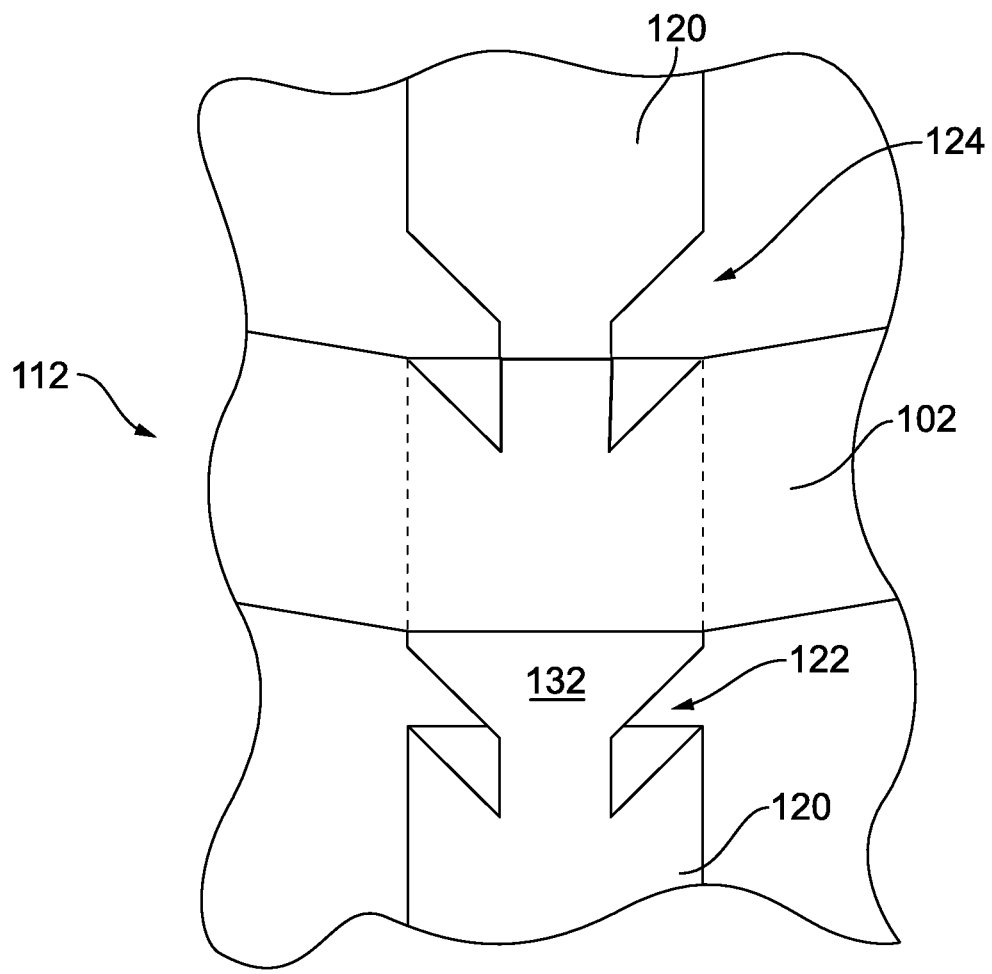
FIG. 4 is a cross-sectional side elevation view of a portion of the stack of FIG. 2, showing the frangible features of the central support rod.
Figure 5:
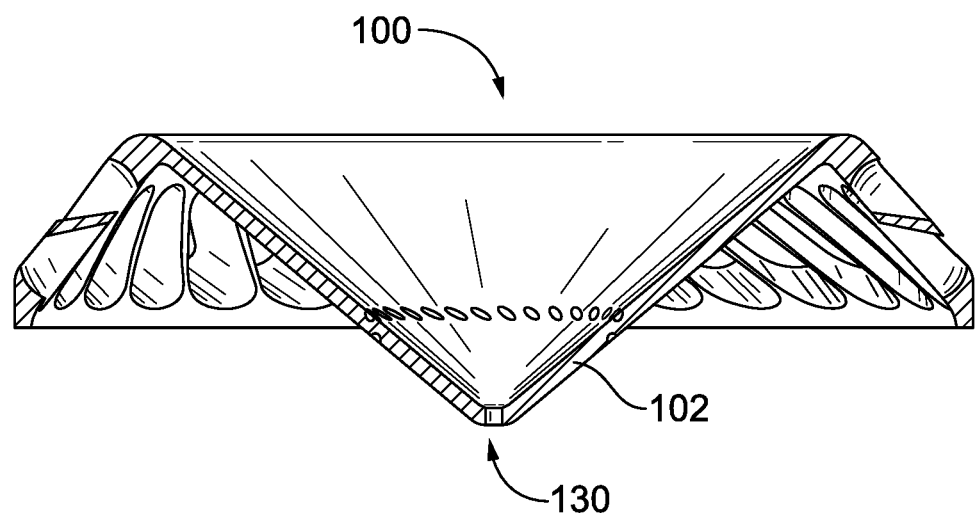
FIG. 5 is a cross-sectional side elevation view of the swirler of FIG. 1, with a central bore therethrough.

As shown in FIG. 4, the central support rod 120 includes frangible features 122, 124 adjacent each swirler 100 connected thereto. Each frangible feature 122 is just below the respective inner body 102 and is a frustoconical indentation in the cylindrical body of the central support rod 120. Each frangible feature 124 is a similar frustoconical indentation just above the respective inner body 102. The connection 124 between the central support rod 120 and the inner body 102 provides support and allows some heat transfer and mechanical support for a proper build. As shown in FIG. 2, an external tube 126 outboard of the swirl vanes 104 and outer rings 108 of the swirlers is built up from the external ring 114 to support the build from outside. There is a respective ledge 128 protruding inward from the external tube 126 for supporting the build of each of the outer rings 108. The frustoconical angle α of the swirl vanes described above with reference to FIG. 1 is conducive to building up in additive manufacturing machines from the ledges 128.

Figure 3:
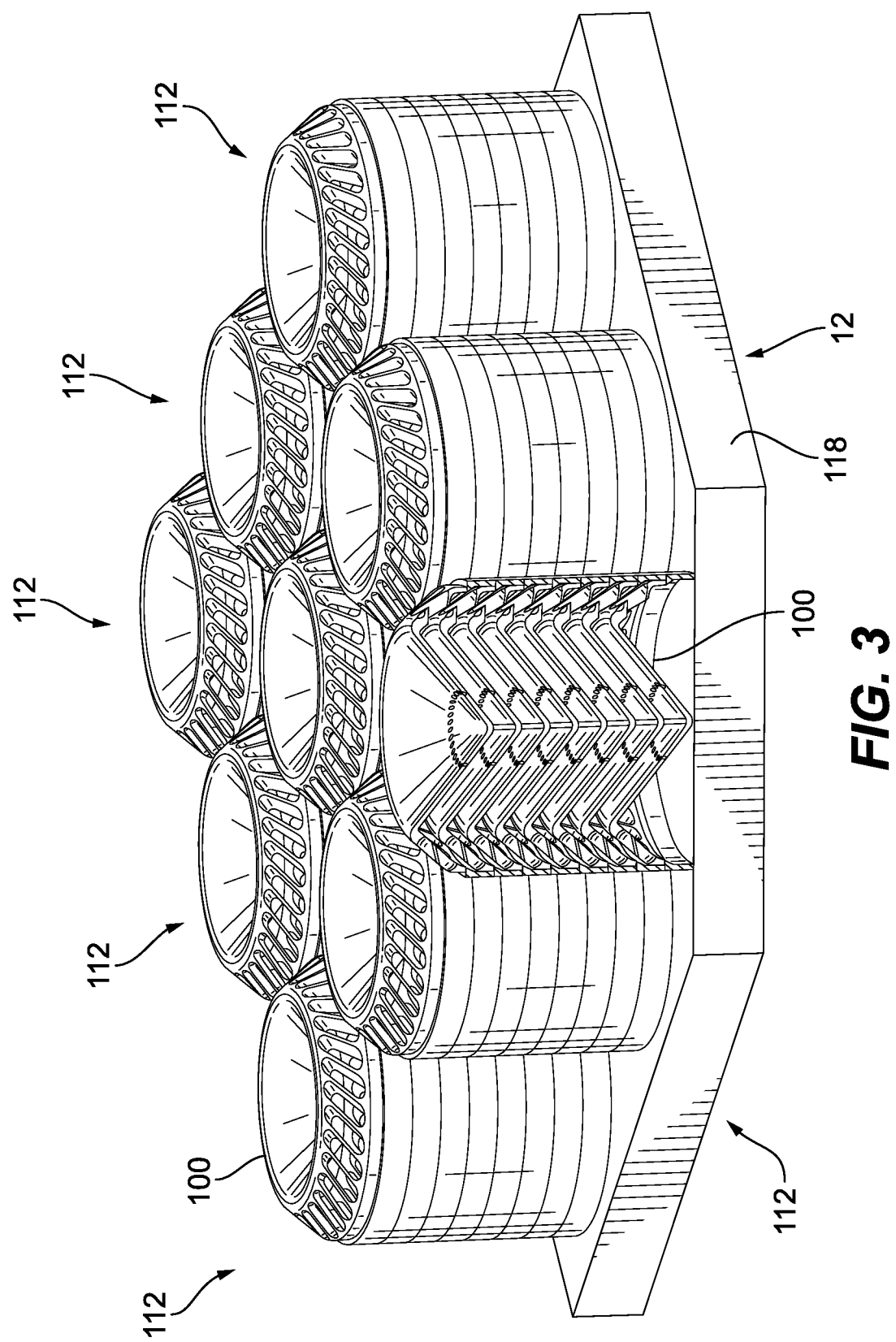
FIG. 3 is a partially cut away perspective view of an additive manufacture build of swirlers like the swirler of FIG. 1, showing a build plate with a plurality of stacks like that of FIG. 2 build thereon.

As shown in FIG. 3, several stacks 112 of swirlers 100 can be fit on a single build plate 118. In this example, there are eight swirlers 100 in each of nine stacks for a total of seventy-two swirlers 100 that can be produced in a single additive manufacture build. Those skilled in the art will readily appreciate that any suitable number of swirlers in each stack, and any suitable number of stacks can be included on a build plate without departing from the scope of this disclosure.

After the build, e.g., the build on build plate 118 in FIG. 3, is complete, each stack 112 can be removed from the build plate 118. The external tube 126, labeled in FIG. 2, can be machined away from the stack 112 using any suitable process such as turning down on a lathe, e.g., to the final braze diameter, to begin separating the swirlers 100 from one another. The frangible features 122, 124 (labeled in FIG. 4) can then be broken to finish separating the swirlers 100 in the stack 112 from one another. Breaking the frangible features 122, 124 can include twisting the swirlers relative to one another about the swirl axis A. Any remnant features of the central support rod 120 can be machined away from the swirler 100 using conventional techniques. Having the support structure 132 (labeled in FIG. 4) between the frangible feature 122 and the inner body 102 protects the inner body 102, e.g., from being damaged during the additive manufacturing process. It is also contemplated that in addition to or in lieu of using the frangible features 122, 124, the swirlers 100 can be separated from one another by machining away the central support rod 120, e.g., by drilling it down the swirl axis A or using electrical discharge machining (EDM), resulting in swirlers 100 with a central aperture 130 through the inner body 102 thereof. This central aperture 130 can be kept as a cooling bore, or can be plugged, e.g. by welding or brazing.

Systems and methods as disclosed herein provide swirlers that can economically be produced using additive manufacturing, while providing design flexibility needed for intricate features such as required in modern engines, e.g. for stringent emissions requirements. Relative to the number of swirlers that can be produced as disclosed herein, there is little support clean up required after a build. The conical geometries disclosed herein provide for nearly self-supporting build structures and allow nesting within one another for compact and efficient manufacturing.

The methods and systems of the present disclosure, as described above and shown in the drawings, provide for swirlers with superior properties including ease of manufacture. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of making swirlers comprising: additively manufacturing a stack of swirlers wherein each swirler includes: an inner body defining a swirl axis; and a plurality of swirl vanes extending outward from the inner body, wherein the swirl vanes define respective swirl slots therebetween for imparting swirl on a fluid passing through the swirl slots;
   wherein additively manufacturing the stack includes building an external ring and an inner point inside the external ring and additively manufacturing the vertical stack in a vertical build direction from the external ring and inner point;
   wherein the inner body of a lower most swirler in the stack originates from the inner point;
   additively manufacturing a support rod aligned with the swirl axis of the swirlers, wherein the support rod is between adjacent swirlers in the stack so that the inner bodies of swirlers in the stack can be built up, each starting from the central support rod and diverging therefrom in the vertical build direction; and separating the swirlers from one another by machining away the central support rod.

2. The method as recited in claim 1, wherein the central support rod includes frangible features adjacent each swirler connected thereto and further comprising breaking the frangible features to separate the swirlers in the stack from one another.

3. The method as recited in claim 2, wherein breaking the frangible features includes twisting the swirlers relative to one another.

4. The method as recited in claim 1, and wherein an external tube outboard of the swirl vanes is built up from the external ring to support the stack from outside.

5. A method of making swirlers comprising: additively manufacturing a stack of swirlers wherein each swirler includes: an inner body defining a swirl axis; and a plurality of swirl vanes extending outward from the inner body, wherein the swirl vanes define respective swirl slots therebetween for imparting swirl on a fluid passing through the swirl slots;

wherein additively manufacturing the stack includes building an external ring and an inner point inside the external ring and additively manufacturing the vertical stack in a vertical build direction from the external ring and inner point;

wherein an external tube outboard of the swirl vanes is built up from the external ring to support the stack from outside; and machining the external tube away to separate the swirlers from one another.

6. The method as recited in claim 5, wherein the inner body of a lower most swirler in the stack originates from the inner point.

7. The method as recited in claim 6, further comprising additively manufacturing a support rod aligned with the swirl axis of the swirlers, wherein the support rod is between adjacent swirlers in the stack so that the inner bodies of swirlers in the stack can be built up, each starting from the central support rod and diverging therefrom in the vertical build direction.

8. The method as recited in claim 7, wherein the central support rod includes frangible features adjacent each swirler connected thereto and further comprising breaking the frangible features to separate the swirlers in the stack from one another.

9. The method as recited in claim 8, wherein breaking the frangible features includes twisting the swirlers relative to one another.

10. The method as recited in claim 7, further comprising separating the swirlers from one another by machining away the central support rod.

\* \* \* \* \*